United States Patent
Chang et al.

(10) Patent No.: US 11,039,173 B2
(45) Date of Patent: Jun. 15, 2021

(54) METHOD OF COMMUNICATING VIDEO FROM A FIRST ELECTRONIC DEVICE TO A SECOND ELECTRONIC DEVICE VIA A NETWORK, AND A SYSTEM HAVING A CAMERA AND A MOBILE ELECTRONIC DEVICE FOR PERFORMING THE METHOD

(71) Applicant: Arlo Technologies, Inc., Carlsbad, CA (US)

(72) Inventors: Rob Chang, Los Altos, CA (US); John Thomas, Carlsbad, CA (US); Jimmy Lin, San Jose, CA (US); Jeff Liu, Fremont, CA (US); Dennis Aldover, Carlsbad, CA (US); Rajinder Singh, San Jose, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 71 days.

(21) Appl. No.: 16/390,636

(22) Filed: Apr. 22, 2019

(65) Prior Publication Data

US 2020/0336768 A1  Oct. 22, 2020

(51) Int. Cl.
  *G06K 9/00* (2006.01)
  *H04N 19/87* (2014.01)
  (Continued)

(52) U.S. Cl.
  CPC .............. *H04N 19/87* (2014.11); *G06T 5/50* (2013.01); *G06T 7/11* (2017.01); *G06T 7/174* (2017.01); *G06T 2207/20132* (2013.01)

(58) Field of Classification Search
  CPC ........................................ G06T 2207/20132
  See application file for complete search history.

(56) References Cited

U.S. PATENT DOCUMENTS 5,153,936 A * 10/1992 Morris ...................... G06T 9/00
                                                               345/428
5,896,465 A *  4/1999 Coppola ............. H04N 19/147
                                                               382/232
(Continued)

FOREIGN PATENT DOCUMENTS

EP       2445168        4/2012
EP       2445168 A1 *  4/2012   ......... H04N 21/2662
(Continued)

OTHER PUBLICATIONS

Authentication of digital image using exit Metadata and Decoding properties, D P Gangwar Gangwar et al., Researchgate, Dec. 1, 2018, pp. 335-341 (Year: 2018).*

*Primary Examiner* — Jayesh A Patel
(74) *Attorney, Agent, or Firm* — Boyle Fredrickson, SC (57) ABSTRACT

A system and method are disclosed for communicating video/images from a first electronic device to a second electronic device via a network. The first electronic device can include a digital video camera and the second electronic device can include a mobile electronic device, such as a smart phone. The method can include, with the first electronic device, acquiring a first image (as part of a video) having a first resolution, transmitting the first image with a second resolution to the second electronic device, receiving a cropping parameter from the second electronic device, acquiring a second image (as part of a video), cropping the second image based on the crop parameter resulting in a third image having a third resolution, and transmitting the third image with the third resolution.

20 Claims, 4 Drawing Sheets

(51) Int. Cl.
*G06T 7/11* (2017.01)
*G06T 7/174* (2017.01)
*G06T 5/50* (2006.01)

(56) References Cited

U.S. PATENT DOCUMENTS

| | | | | |
|---|---|---|---|---|
| 6,904,176 | B1* | 6/2005 | Chui | H04N 19/63 |
| | | | | 375/E7.04 |
| 7,512,262 | B2* | 3/2009 | Criminisi | G06K 9/00241 |
| | | | | 382/106 |
| 8,385,691 | B2* | 2/2013 | Shuster | G06F 16/951 |
| | | | | 382/305 |
| 8,587,653 | B1* | 11/2013 | Vidunas | H04N 5/247 |
| | | | | 348/143 |
| 9,025,887 | B2* | 5/2015 | Morikawa | G06T 7/12 |
| | | | | 382/203 |
| 9,198,728 | B2* | 12/2015 | Wang | B25J 13/06 |
| 9,230,330 | B2* | 1/2016 | Luo | G06T 7/593 |
| 9,355,432 | B1* | 5/2016 | Goldman | G06K 9/4671 |
| 9,508,119 | B2* | 11/2016 | Samvik | G06T 11/60 |
| 2003/0058275 | A1* | 3/2003 | Pilu | H04N 7/147 |
| | | | | 715/751 |
| 2003/0072372 | A1* | 4/2003 | Shen | H04N 19/176 |
| | | | | 375/240.16 |
| 2005/0134707 | A1* | 6/2005 | Perotti | H04N 5/23293 |
| | | | | 348/239 |
| 2006/0192860 | A1* | 8/2006 | Atsumi | H04N 19/154 |
| | | | | 348/222.1 |
| 2007/0280357 | A1* | 12/2007 | Sung | H04N 21/44004 |
| | | | | 375/240.25 |
| 2008/0129844 | A1* | 6/2008 | Cusack | H04N 5/23229 |
| | | | | 348/241 |
| 2012/0140067 | A1* | 6/2012 | Crossen | H04N 7/18 |
| | | | | 348/143 |
| 2012/0188329 | A1* | 7/2012 | Archer | G06T 5/006 |
| | | | | 348/14.08 |
| 2012/0236181 | A1* | 9/2012 | Noyes | H04N 5/23216 |
| | | | | 348/240.2 |
| 2013/0208134 | A1* | 8/2013 | Hamalainen | H04N 5/23258 |
| | | | | 348/208.99 |
| 2014/0003495 | A1* | 1/2014 | Chuang | H04N 19/51 |
| | | | | 375/240.02 |
| 2014/0044358 | A1* | 2/2014 | Srinivasan | G06Q 50/01 |
| | | | | 382/190 |
| 2015/0208103 | A1 | 7/2015 | Guntur et al. | |
| 2016/0309090 | A1* | 10/2016 | Park | G06F 3/04815 |
| 2016/0366369 | A1* | 12/2016 | Balasaygun | H04N 7/147 |
| 2017/0223311 | A1* | 8/2017 | Kim | H04N 21/42224 |
| 2018/0070023 | A1* | 3/2018 | Oh | H04N 5/2625 |
| 2018/0129657 | A1* | 5/2018 | Guest | G06F 9/44 |

FOREIGN PATENT DOCUMENTS

| | | | |
|---|---|---|---|
| GB | 2526773 A | * 12/2015 | H04N 19/59 |
| WO | 2012021246 | 2/2012 | |

* cited by examiner

METHOD OF COMMUNICATING VIDEO FROM A FIRST ELECTRONIC DEVICE TO A SECOND ELECTRONIC DEVICE VIA A NETWORK, AND A SYSTEM HAVING A CAMERA AND A MOBILE ELECTRONIC DEVICE FOR PERFORMING THE METHOD

BACKGROUND OF THE INVENTION

1. Field of the Invention

The present invention relates to a system and method of communicating video over a network. The present invention more particularly relates to a system and method including a first electronic device, such as a digital camera, and a second electronic device, such as a mobile electronic device, for communicating enlarged images of a video.

2. Discussion of the Related Art

Internet-enabled video cameras are in wide use and are often used for security and monitoring purposes. Content captured by video cameras can be communicated over the Internet. The content can be viewed in substantially real time and/or recorded for later viewing. With the advent of higher resolution sensors and screens, there is growing interest to deliver the highest resolution videos at all times.

A high-resolution video, when viewed at various levels of enlargement on a viewing screen, offers increased clarity that enables identification of facial features, items, or other information. However, bandwidth constraints often prevent live content from being streamed at the highest resolution, thereby necessitating a careful balance between bandwidth and desired visual clarity.

At present, Internet-enabled video cameras and video viewing devices can commonly employ one or more mechanisms of "zoom modes" to enlarge videos: optical lenses, sensor cropping, and/or digital zoom on a presentation screen. To deliver the highest clarity image for a given bandwidth, all of these modes should be coordinated. However, each of these modes operates independently and must be either manually controlled by the user or automatically coordinated. Because streaming video over the Internet occurs under intermittent time delays (e.g., due to network congestion), it is difficult to automatically coordinate the combination of digital zoom with other zoom modes. The result is a visual experience that is trying to the user.

Accordingly, a need exists to automatically coordinate multiple enlargement mechanisms in a fashion that delivers a seamless transition between modes as a streaming video is interactively enlarged, regardless of the timing delays that may be incurred while the video content is transported over the Internet.

SUMMARY OF THE INVENTION

The subject matter herein describes a high-resolution digital camera that streams live video over the Internet to a mobile device. When a video is viewed, it may be interactively enlarged, for example, by physically interacting with a touch screen on the mobile device, in order to inspect a region of interest. However, the video will display increasingly less detail as it is enlarged in digital zoom. In aspects, the invention automatically delivers increased detail by coordinating a camera's digital or optical enlargement mechanism, e.g., sensor cropping, with the electronic mobile device's digital zoom in such a way that the transition between modes is fluid and substantially seamless to the viewing user. The resulting viewing experience allows a user to smoothly enlarge an image and then observe the highest resolution without substantial visual discontinuities.

In one aspect, a method of communicating video from a first electronic device to a second electronic device via a network is disclosed. The first electronic device can include a digital video camera and the second electronic device can include a mobile electronic device, such as a smart phone. The method includes, with the first electronic device, acquiring a first image (as part of a video) having a first resolution, transmitting the first image with a second resolution to the second electronic device, receiving a cropping parameter (e.g., a crop zone or crop frame) from the second electronic device, acquiring a second image (as part of a video), cropping the second image based on the cropping parameter resulting in a third image having a third resolution, and transmitting the third image with the third resolution.

In a further aspect, the method can include, with the second electronic device, receiving the first image with the second resolution, displaying the first image with the second resolution, receiving a digital zoom input, transmitting the cropping parameter to the first electronic device, the cropping parameter being based on the digital zoom input, receiving the third image with the second resolution, and displaying the third image with the second resolution.

Another aspect of the present invention provides a digital video camera in communication with a second electronic device via a network. The camera includes a lens, an image capture element, a processor, and a memory communicably coupled to the processor. The memory stores a video capture module, a video processing module, and a communication module. The video capture module includes instructions that when executed by the processor cause the processor to capture a plurality of images. The video processing module includes instructions that, when executed by the processor, cause the processor to acquire a first image having a first resolution from the video capture module, convey the first image with a second resolution, receive a cropping parameter, acquire a second image with a third resolution from the video capture module, and convey the second image having the second resolution. The communication module includes instructions that, when executed by the processor, cause the processor to transmit a plurality of conveyed images from the video processing module, and to receive the cropping parameter.

In a further aspect, the present invention provides a system for capturing, transmitting, and displaying a video. The system includes the camera and a mobile electronic device. The mobile electronic device includes an output apparatus to display a plurality of images, an input apparatus to receive a digital zoom input, a processor, and a memory communicably coupled to the second processor. The memory stores a video display module, a digital zoom module, and a communication module. The video display module includes instructions that, when executed by the processor, cause the processor to display a plurality of images. The digital zoom module includes instructions that, when executed by the processor, cause the processor to receive a digital zoom input, create the cropping parameter based on the digital zoom input, and convey the cropping parameter. The communication module includes instructions that, when executed by the processor, cause the processor to receive images from the camera, and to transmit the cropping parameter.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
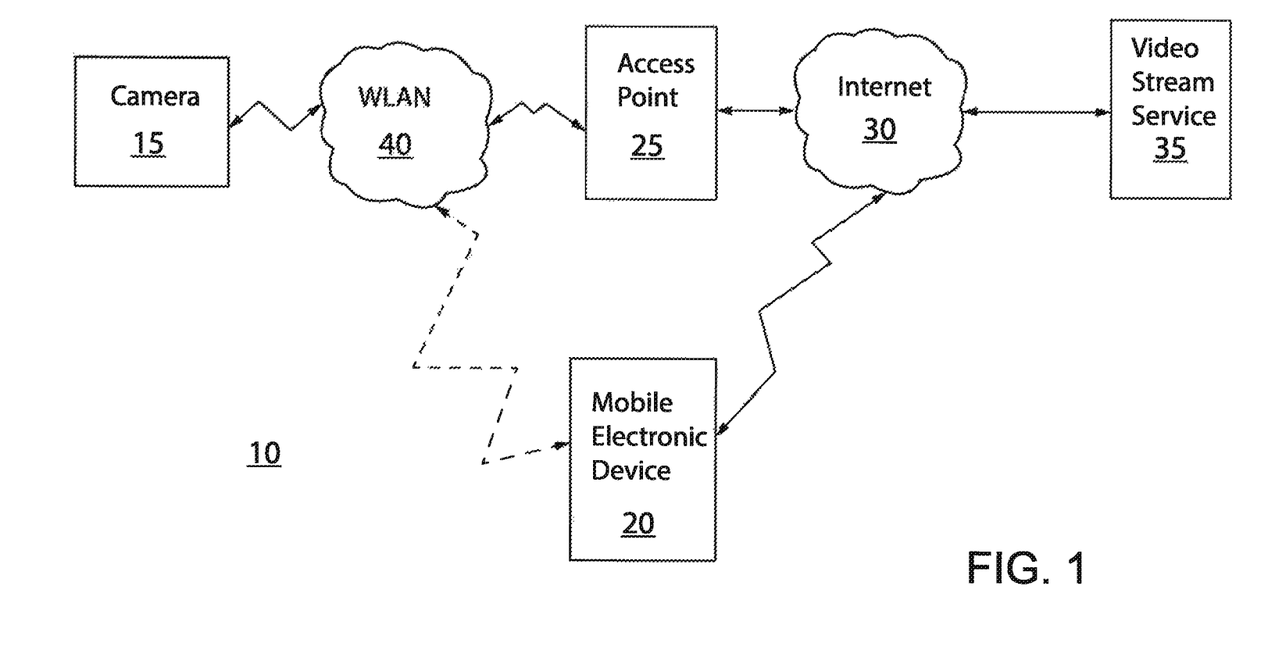
FIG. 1 is block diagram representing a system for capturing, transmitting, and displaying a video according to aspects of the invention.

FIG. 1 represents a system 10 for capturing, transmitting, and displaying a video. The video is acquired at a first location and, typically, displayed at a second location. The shown system 10 includes a first electronic device, shown as a digital video camera 15, and a second electronic device, shown as a mobile electronic device (MED) 20. The camera 15 is in communication with an access point 25 coupled to the Internet 30, and the mobile device 20 is also in communication with the Internet 30. The shown system 10 also includes a video stream service 35 coupled to the Internet 30.

Figure 2:
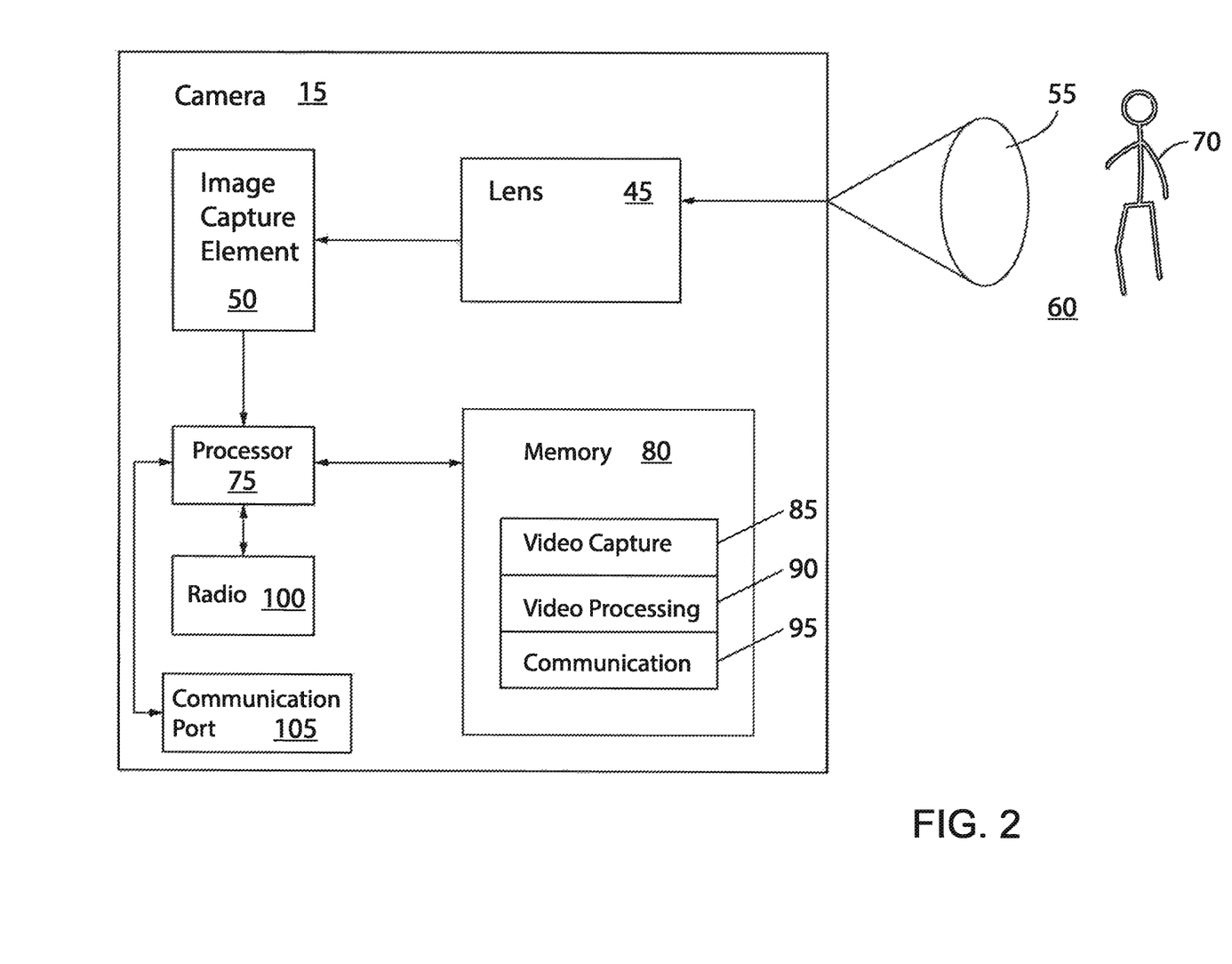
FIG. 2 is a block diagram representing a camera shown in FIG. 1.

It is contemplated that many different arrangements are possible for the system 10, and the shown system 10 is provided for ease of explanation. For example, the access point (AP) 25 may be one component of a larger wired and/or wireless local area network (LAN) having many access points (e.g., a wired or wireless router, a plurality of wireless LAN extenders, a plurality of wired ports, etc.), a switch or hub, a modem, and similar components known in the art. In the specific implementation shown, the AP 10 is a base station that provides a wireless LAN (WLAN) 40 and has a modem for connection to the Internet 30. It is also contemplated that the MED 20 may be directly coupled (e.g., wirelessly) to the camera 15 or via the WLAN 40 and the AP 25. The shown WLAN 40 can be a network following the standards set forth by the Wi-Fi Alliance. Accordingly, the WLAN 40 shown in FIG. 2 is a Wi-Fi network. However, the WLAN 40 can be or include other wireless local area networks.

Electronic devices communicate data to and from the camera 10. One example electronic device is the MED 20. The MED 20 is an electronic device that is generally considered by one skilled in the art as readably mobile even though the device can be stationary. Exemplary mobile electronic devices can be a smart phone, tablet computer, or a laptop computer, etc. The electronic device can also be a stationary electronic devices (SED). A SED, such as a desktop computer, is an electronic device that is generally considered by one skilled in the art as stationary even though the device can move.

Another electronic device that communicates data to and from the camera is the video stream service 35. The video stream service 35 can be a commercially available service for storing and/or analyzing the images and/or video. Exemplary analyzing services include enabling the camera to differentiate between humans and animals, reducing false motion notifications, sending alerts and screenshots to the MED 20, etc. The video stream service 35 can also provide a secure gateway for video to be communicated from the camera 15 to the MED 20. An exemplary video stream service 35 is Arlo's Smart™ video stream service available from Arlo Technologies, Inc. in San Jose, Calif., U.S.

FIG. 2 represents the camera 15 shown in FIG. 1. The camera 15 can include a lens 45 and an image capture element 50. The image capture element 50 can be any suitable type of image capturing device or system, including, for example, an area array sensor, a Charge Coupled Device (CCD) sensor, a Complementary Metal Oxide Semiconductor (CMOS) sensor, or a linear array sensor, just to name a few possibilities. The image capture element 50 may capture images in any suitable wavelength on the electromagnetic spectrum. The image capture element 50 may capture color images and/or grayscale images.

Figure 4:
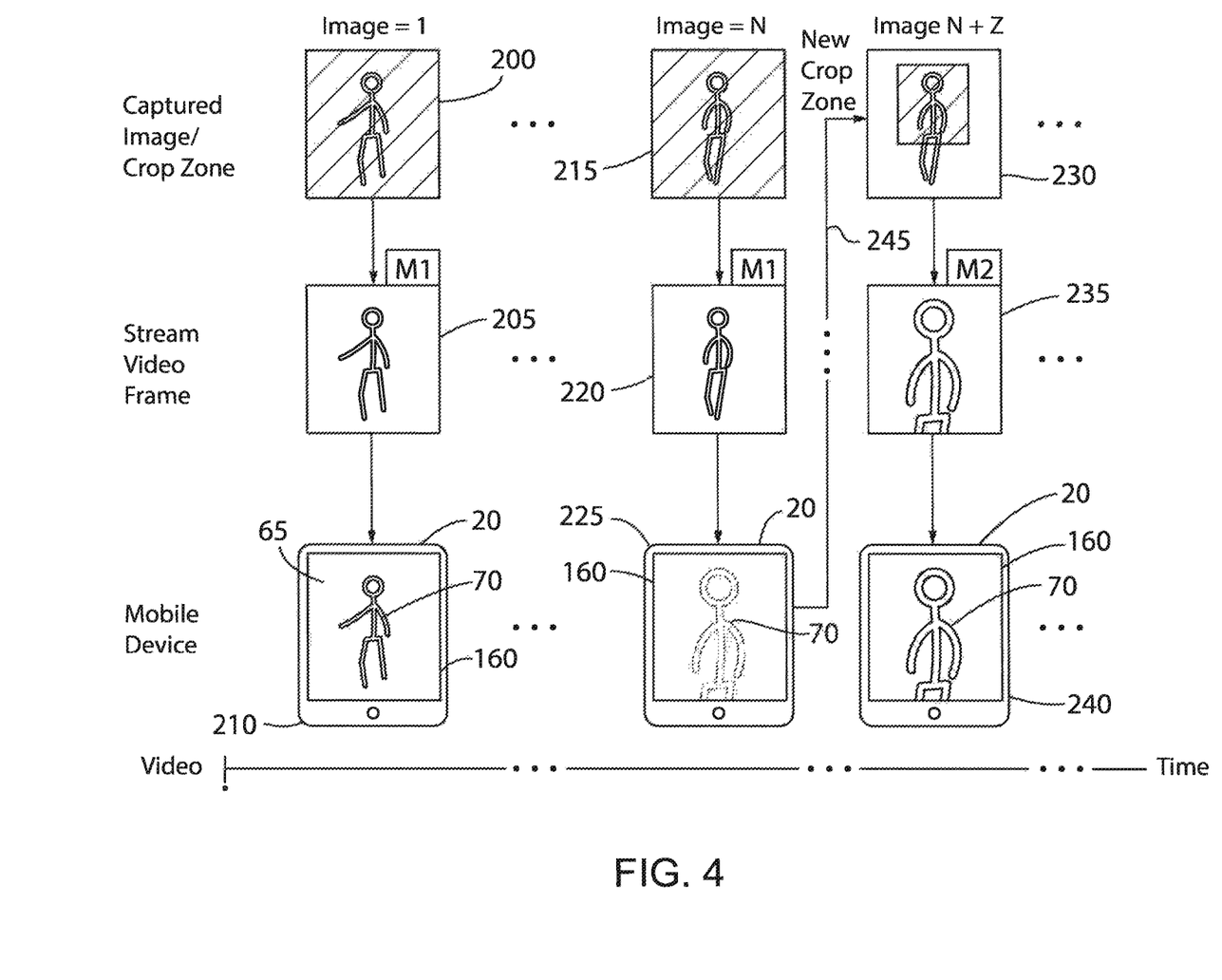
FIG. 4 is a flow diagram of a method of communicating video from the camera to the mobile electronic device, the flow diagram including a plurality of pictorial representations over time.

The camera 15 has a field of view 55 extending radially from the outwardly facing lens 45. The field of view 55 is a portion of the environment 60 within which the camera 15 can detect electromagnetic radiation via the lens 45 and image capture element 50. The camera 15 is configured to capture images. An image is a digital representation of a scene for the environment 60 as captured by the camera 15. Capturing an image refers to the act of obtaining and recording an image data file or stream of the digital representation. The scene is the portion of the environment 60 observed through the field of view 55. Capturing a plurality of images in a timed sequence can result in a video. Capturing a video refers to the act of obtaining and recording a video data file or stream of the digital representation. An example image 65 is shown in FIG. 4 and is an image captured with the camera 15. The image 65 may be part of a video and can be displayed on the MED 20. The image 65 includes an object 70, which is a person for FIG. 4.

Referring back to FIG. 2, the camera 15 has a processor 75 and a memory 80. While the arrangement of FIG. 2 shows a single processor and a single memory, it is envisioned that many other arrangements are possible. For example, it is envisioned that the functions discussed below for the processor 75 and memory 80 can be split among multiple processors and memories.

The processor 75 can include any component or group of components that are configured to execute, implement, and/or perform any of the processes or functions described herein or any form of instructions to carry out such processes or cause such processes to be performed. Examples of suitable processors include a microprocessor, microcontroller, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 75 can include a hardware circuit (e.g., an integrated circuit) configured to carry out instructions contained in program code. In arrangements in which there are a plurality of processors, such processors can work independently from each other or one or more processors can work in combination with each other.

The memory 80 stores one or more types of instructions and/or data. The memory 80 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 80 can be a component of the processor 75, can be operatively connected to the processor 80 for use thereby, or a combination of both.

The memory 80 can include various instructions stored thereon. For example, the memory 80 can store one or more modules. Modules can be or include computer-readable instructions that, when executed by the processor 75, cause the processor 75 to perform the various functions disclosed herein. While functions may be described herein for purposes of brevity, it is noted that the functions are performed by the processor 75 using the instructions stored on or included in the various module described herein. Some modules may be stored remotely and accessible by the processor 75 using, for instance, various communication devices and protocols.

The memory 80 can store a video capture module 85, a video processing module 90, and a communication module 95. The video capture module 85 includes instructions that function to control the processor 75 to capture a plurality of images (or video) with the image capture element and convey the plurality of images to the video processing module. The video processing module 90 includes instructions that function to control the processor 75 to process the received plurality of images and convey a video stream, including processed images, to the communication module. The communication module includes instructions that function to control the processor 75 to transmit the conveyed video stream to the MED 20. Further explanation for the video capture module 85, the video processing module 90, and the communication module 95 is provided below in connection with the operation of the system 10.

The camera 15 communicates wirelessly (e.g., with the AP 25) via a radio 100. An example of a wireless radio 100 include a wireless local area network (WLAN) radio. With the WLAN radio, the camera 15 generally communicates over a short-range wireless communication network, such as the WLAN 40. Alternatively, the camera 15 can communicate via a wired communication port 105. For example, the camera 15 can communicate with the AP 25 if the AP 25 is a wired access point. An exemplary camera capable of incorporating aspects of the invention is an Arlo Ultra brand camera available from Arlo Technologies in San Jose, Calif., US.

Figure 3:
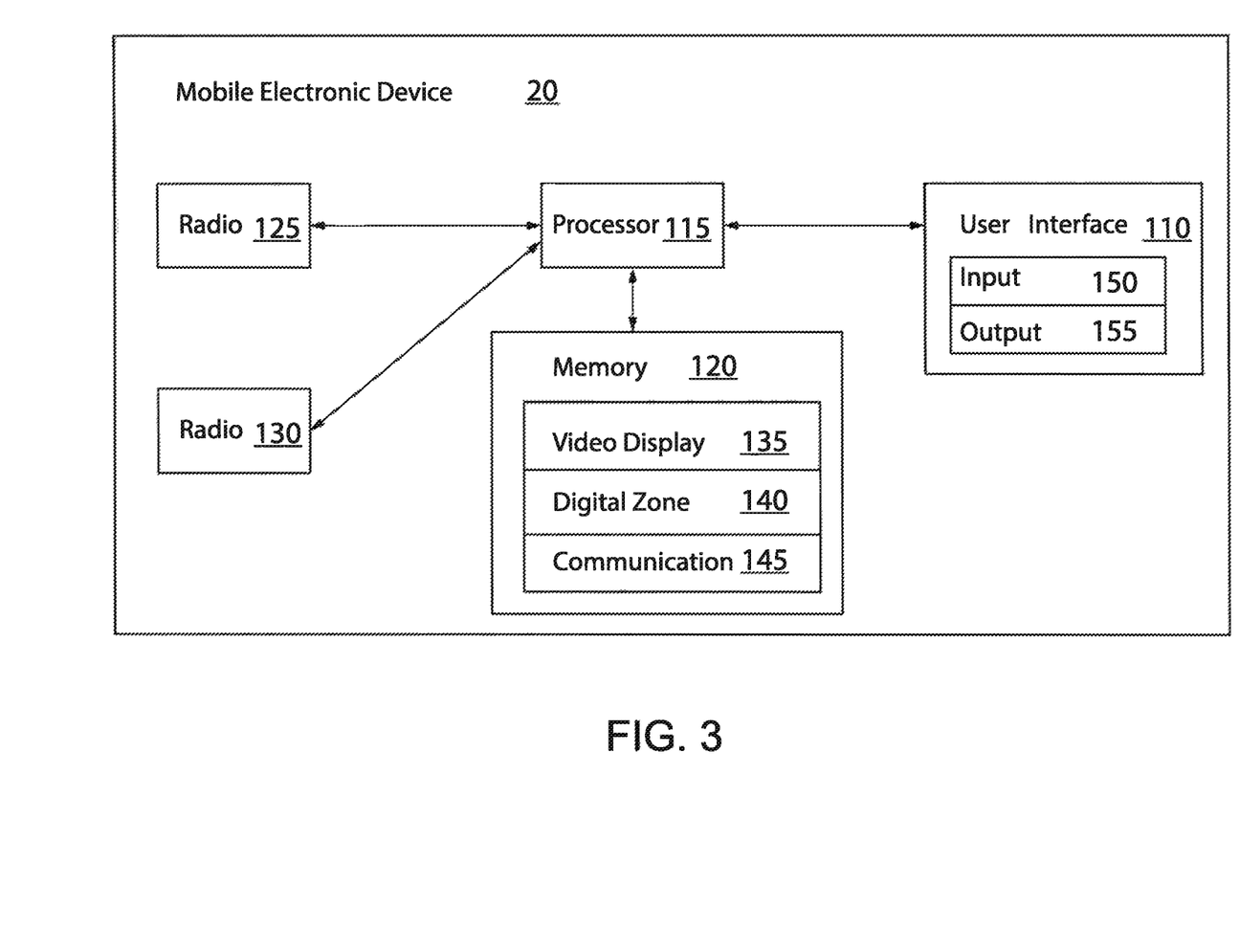
FIG. 3 is a block diagram of a mobile electronic device shown in FIG. 1.

FIG. 3 represents the MED 20 in FIG. 1. The MED 20 includes various components common to many typical mobile electronic devices such as smart phones, tablet computers, notebook and netbook computers, and the like. The various components include the processing power, memory, and programming to perform complex tasks, run complex programs, and interact substantially with a user. The shown MED 20 includes a user interface 110, a processor 115, a memory 120, a first radio 125, and a second radio 130. While one of each component is shown, the MED 20 can include a plurality of one or more of the components 110-130.

As mentioned, the MED 20 has a processor 115 and a memory 120. While the arrangement of FIG. 4 shows a single processor and a single memory, it is envisioned that many other arrangements are possible. For example, multiple elements of the MED 20 can include a distinct processor and memory.

The processor 115 can include a component or group of components that are configured to execute, implement, and/or perform any of the processes or functions described herein for the MED 20 or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 115 can include a hardware circuit (e.g., an integrated circuit) configured to carry out instructions contained in program code. In arrangements in which there are a plurality of processors 115, such processors 115 can work independently from each other or one or more processors 115 can work in combination with each other.

The MED 20 includes a memory 120 for storing one or more types of instructions and/or data. The memory 120 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 120 can be a component of the processor 115, can be operatively connected to the processor 120 for use thereby, or a combination of both.

In one or more arrangements, the memory 120 can include various instructions stored thereon. For example, the memory 120 can store one or more modules. Modules can be or include computer-readable instructions that, when executed by the processor 115, cause the processor 115 to perform the various functions disclosed for the module. While functions may be described herein for purposes of brevity, it is noted that the functions are performed by the processor 115 using the instructions stored on or included in the various module described herein. Some modules may be stored remotely and accessible by the processor 115 using, for instance, various communication devices and protocols.

The memory 120 can store a video display module 135, a digital zoom module 140, and a communication module 145. The video display module 85 includes instructions that function to control the processor 75 to display a plurality of images (or video) with the user interface 110 and convey a plurality of images to the digital zoom module. The digital zoom module 140 includes instructions that function to control the processor 75 to receive a plurality of images from the video display module and receive a digital zoom input from a user via the user interface 110. Further, the digital zoom module 140 can convey a cropping parameter (discussed below) to the communication module 145. The communication module 145 includes instructions that function to control the processor 75 to receive the conveyed video stream from the camera 15 the MED 20 and transmit the cropping parameter to the camera 15. Further explanation for the video display module 135, the digital zoom module 140, and the communication module 145 is provided below in connection with the operation of the system 10.

The MED 20 communicates wirelessly through various radios 125/130. Examples of wireless radios include a wireless wide area network (WWAN) radio 125 and a wireless local area network (WLAN) radio 130. With the WWAN radio 125, the MED 20 would generally communicate over a long-range wireless communication network such as 3G, 4G, LTE, 5G, and the like. With the WLAN radio 130, the MED 20 would generally communicate over a short-range wireless communication network such as the WLAN 40. Portions of the WWAN radio 125 may be combined with portions of the WLAN radio 130.

The MED 20 includes the user interface 110. The user interface 110 can include an input apparatus 150 and an output apparatus 155. The input apparatus 150 includes a device, component, system, element, or arrangement or groups thereof that enable information/data to be entered into the MED 20. The input apparatus 150 can receive an input from the user. The output apparatus 155 includes any device, component, or arrangement or groups thereof that enable information/data to be presented to the user. The input apparatus 150 and the output apparatus 155 can be combined as a single apparatus, such as a touch screen commonly used by many electronic devices. FIG. 4 shows a video being displayed on a touch screen 160 of the MED 20.

The system 10 will be described herein with reference to a plurality of image/video resolutions. A resolution is the sharpness of an image (or video) or of the fineness with which a device can produce, record, transmit, and/or receive such an image. Resolution is usually expressed as a number or density of pixels in the image or an aspect of the image. Two common resolutions at the time of this application are 4096×2160 pixels, which is commonly referred to as 4K resolution, and 1920×1080 pixels, which is commonly referred to as 1080 or HD resolution. These resolutions are referred to herein as exemplary resolutions to help ease explanation. However, the invention is not limited to any specific resolutions. Other resolutions may be generically referred to herein as first resolution, second resolution, etc.

During operation, the camera 15 acquires a first image at a first resolution, e.g., 4K resolution. For example, the camera 15 captures an image (or scene) of an environment 60. The image corresponds to what is in the field of view 55 of the camera 15. The field of view 55 can be based on the type of lens 45, whether the lens 45 has a mechanical zoom, etc. The image is acquired by the image capture element 50, and processed by the processor 75 and memory 80. The acquired first image 65 has a first resolution. For the purposes of example, the first resolution is a 4K resolution, and the camera 15 is referred to herein as a 4k camera. For the first image shown in FIG. 4 (identified by ref. no. 200), the first image is captured with a crop zone or of 100%. Cropping refers to the removal of unwanted outer areas from an image. The crop zone relates to a zone, boundary, or related crop parameter from which cropping occurs. A crop zone of 100% means that the "full" image is used and no "cropping" occurs. However, it should be understood that a less than "full" image may correspond to a crop zone of 100% and some "cropping" may still occur; for example, to remove image discrepancies caused by the lens at an edge of an image. In FIG. 4, the representation of ref. no. 200 schematically represents a crop zone of 100% superimposed over a captured image.

Before proceeding further, the image of ref. no. 200 is one of many acquired images as part of a video, which is a series of images. The video can be communicated over the system 10 using a video compression and communication technique as is commonly known in the art. Unless explicitly discussed herein, the video compression and communication technique is in addition to and beyond the image processing techniques discussed herein. The representations 205, 220, and 235 (of FIG. 4) schematically represent frames in a video stream. Included with the representations 205, 220, and 235 is metadata. It is common for video compression and communication techniques to include metadata within the video file/stream. Metadata is data inside the video file/stream that provides information about other data in the video file/stream. Example metadata can include operational gathered metadata, such as information about the content produced, the type of equipment, software, date, and location. The actual video stream frame may be compressed according to the video compression technique used.

In some systems, the camera 15 compresses/reduces the resolution of the image to allow for easier transmission of the image over the network. For example, an image with a 4K resolution (i.e., a first resolution) may be compressed to a 1080 resolution (i.e., a second resolution). The 1080 resolution allows for communication from the camera 15 to the MED 20 via the Internet 30 with a reduced latency and bandwidth requirements. In FIG. 4, the representation 200 includes an image having 4K resolution, and the representation 210 includes the image having a 1080 resolution. In some implementations, the 1080 image is first communicated to the video stream service 35, e.g., to allow for recordation and initial analysis, and then communicated to the MED 20.

Upon viewing the image (representation 210) at the MED 20, the user may be interested in a portion of the image or, more generally, the video. For the shown example, the user may be interested in the face of the person in the video. While the video is being transmitted and viewed, the user can digitally zoom to a portion of the image (shown in representation 225). Using a smart phone with a touch screen as the exemplary MED 20, the user can zoom onto the person's face using a zoom technique that is well known for the device, such as a "pinch zoom" technique. Moreover, the video zooms on the touch screen of the smartphone as is commonly known. However, the zoomed image (shown in representation 225) may become pixilated since the video is using the original resolution of the video. The pixelated image may or may not be noticed by the user depending on the resolution of the zoomed image. FIG. 4 shows the digital zooming process by the user taking "N" frames.

The MED 20 communicates (represented by ref. no. 245) a new cropping parameter (e.g., a new crop zone or crop frame) to the camera 15 based on the zooming action of the user. At what point the new crop zone is communicated by the MED 20 can vary based on the design of the system. For example, a new crop zone can be communicated periodically as the user provides the zoom input. Conversely, a new crop zone can be communicated upon completion of the zoom input (e.g., the user lifts her fingers off the touch screen). Further, the new cropping parameter may not be received by the camera 15 until N+Z video frames due to latency within the system 10. That is, the latency time from ref. no. 225 to ref no. 230 is Z frames.

After receiving the new crop zone, the camera 15 captures, digitizes, compresses, and transmits an image substantially as described earlier. However, prior to compressing the new image, the camera 15 uses only the information of the new crop zone to transmit the image. In one implementation, the image capture element 50 only captures the portion of the new crop zone. In a second implementation, the image capture element 50 captures the full image and the processor 75 then utilizes only a portion of the image corresponding to the new crop zone. When the camera 15 communicates the image represented by ref. no. 235, the video stream frame includes a marker in the metadata of the frame identifying that a cropped image is being transmitted. A few examples of how the camera crops the image are described below:

For a first example, the crop zone may correspond directly to a 1080 resolution (i.e., the second resolution). In this scenario, a compression of 1.0 (i.e., no compression) is used, and the camera transmits the image with the second resolution.

For a second example, the crop zone may still be larger than the 1080 resolution (i.e., the second resolution). Hence, the image resulting from the crop zone is compressed to the second resolution for transmission.

For a third example, the received crop zone may be smaller than the 1080 resolution. The imaging process can perform multiple alternatives. A first alternative is to use an acquired crop zone corresponding to the second resolution and to operate similar to the first example. A second alternative is to communicate the image with a reduced resolution less than the second resolution and to have the MED 20 extrapolate the image. A third alternative is for the camera 15 to extrapolate the image and then communicate the extrapolated image at the second resolution.

As part of the video stream, when the MED 20 receives the image with the marker (at reference no. 240), the MED 20 revises its pixilated image to the third image. The result is that the image of the MED 20 is no longer pixilated, assuming the crop zone is at least as large as the second resolution. The user can continue to zoom the video after ref. no. 240 similar to what was discussed above.

The inclusion of the marker ensures that coordination of crop and digital zooms can be coordinated regardless of network latency. In FIG. 4, metadata in the video stream is represented by M1 and M2. For this implementation, the marker is the change of metadata from M1 to M2. More specifically, operational gathered metadata related to the crop zone changes from metadata M1 to metadata M2 communicated to the mobile device 20, thereby indicating the new crop zone and providing the marker.

Further, it is envisioned that the marker, through the metadata, may be included in more than one frame to ensure robustness in the event video frames are lost in transit. Coordination can help ensure a visually appealing experience. Further, coordination ensures digital zoom values will be simultaneously adjusted when video frames with (new) cropping zones are received. Without this coordination, the image will shrink and expand erratically. More specifically, with the new crop zone in metadata M2, the MED 20 can automatically adjust how the image is displayed, and zoomed if necessary, thereby providing a more pleasant experience for the user.

In some operations, the user can zoom out the video shown by reference no. 240. As being viewed by the user, the MED 20 can add letter and/or portrait bars while the image is being zoomed out. The MED 20 can communicate a new crop zone back to the camera and the camera can process a first image of the video after the communicated crop zone similar to what was discussed for reference no. 230.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc. that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The block diagrams and flowcharts in the figures illustrate the architecture, functionality, and operation of possible implementations of systems, methods, and computer program products according to various embodiments. In this regard, each block in the block diagrams or flowcharts may represent a module, segment, or portion of code, which comprises one or more executable instructions for implementing the specified logical function(s). It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" includes a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in a combination of one or more programming languages, including an object-oriented programming language such as Java™, Smalltalk, C++ or the like and conventional procedural programming languages, such as the "C" programming language or similar programming languages. The program code may be executed entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

In addition, the individual components need not be assembled in the disclosed configuration but could be assembled in virtually any configuration. Furthermore, all the disclosed features of each disclosed embodiment can be combined with, or substituted for, the disclosed features of every other disclosed embodiment except where such features are mutually exclusive.

What is claimed is:

1. A method of communicating video from a first electronic device to a second electronic device via a network the method comprising:
   with the first electronic device:
      acquiring a first image having a first resolution;
      transmitting the first image with a second resolution to the second electronic device, the second resolution being different than the first resolution;
      receiving a cropping parameter from the second electronic device;
      acquiring a second image;
      cropping the second image based on the cropping parameter resulting in a third image, the third image having a third resolution; and
      transmitting the third image with the second resolution to the second electronic device; and
      transmitting a marker associated with the second image to the second electronic device.

2. The method of claim 1, wherein the first electronic device includes a digital video camera and the second electronic device includes a mobile electronic device.

3. The method of claim 1, wherein the cropping the second image occurs concurrently with the acquiring the second image.

4. The method of claim 1, wherein the acquiring the second image occurs before the cropping the second image, and wherein the acquired second image has the first resolution.

5. The method of claim 1, further comprising, with the first electronic device, compressing the first image from the first resolution to the second resolution, the second resolution being less than the first resolution, wherein compressing the first image results in a compressed image and wherein the transmitting the first image with the second resolution includes transmitting the compressed image.

6. The method of claim 1, wherein the first resolution is a maximum resolution of the camera to acquire the image, wherein the second resolution is a transmission resolution, and wherein the transmission resolution is less than the maximum resolution.

7. The method of claim 1, further comprising, with the first electronic device, compressing the third image from the third resolution to the second resolution, the second resolution being less than the third resolution, wherein compressing the third image results in a compressed image and wherein the transmitting the third image with the second resolution includes transmitting the compressed image.

8. The method of claim 1, further comprising:
   with the second electronic device
      receiving the first image with the second resolution;
      displaying the first image with the second resolution;
      receiving a digital zoom input;
      transmitting the cropping parameter to the first electronic device, the cropping parameter being based on the digital zoom input;
      receiving the third image with the second resolution;
      displaying the third image with the second resolution; and
      transitioning to the third image after receiving the marker.

9. The method of claim 8, further comprising, with the second electronic device, defining a crop zone based on the digital zoom input, and wherein the cropping parameter includes the crop zone.

10. A method of communicating video from a first electronic device to a second electronic device via a network, the method comprising:
    with the first electronic device:
        acquiring a first image having a first resolution;
        transmitting the first image with a second resolution to the second electronic device, the second resolution being different than the first resolution:
        receiving a cropping parameter from the second electronic device, wherein the cropping parameter includes a crop zone and wherein a fourth resolution associated with the crop zone is less than the second resolution;
        acquiring a second image;
        cropping the second image based on the cropping parameter resulting in a third image, the third image having a third resolution, wherein cropping the second image is further based on the third resolution being the same as the second resolution when the fourth resolution is less than the second resolution, thereby the third image having a resolution greater than the fourth resolution of the crop zone; and
        transmitting the third image with the second resolution to the second electronic device.

11. The method of claim 10, further comprising:
    with the second electronic device
        receiving the first image with the second resolution;
        displaying the first image with the second resolution;
        receiving a digital zoom input;
        transmitting the cropping parameter to the first electronic device, the cropping parameter being based on the digital zoom input;
        receiving the third image with the second resolution; and
        displaying the third image with the second resolution.

12. A digital video camera in communication with a second electronic device via a network, the camera comprising:
    a lens;
    an image capture element;
    a processor; and
    a memory communicably coupled to the processor and storing:
        a video capture module including instructions that, when executed by the processor, cause the processor to capture a plurality of images,
        a video processing module including instructions that, when executed by the processor, cause the processor to;
        acquire a first image having a first resolution from the video capture module,
        convey the first image with a second resolution,
        receive a cropping parameter,
        acquire a second image with a third resolution from the video capture module, and
        convey the second image having the second resolution, and
        a communication module including instructions that when executed by the processor cause the processor to:
        transmit a plurality of conveyed images from the video processing module to the second electronic device,
        transmit a marker associated with the second image to the second electronic device, and
        receive the cropping parameter.

13. The camera of claim 12, wherein the video capture module captures the plurality of images as part of a captured video.

14. The camera of claim 13, wherein the video processing module further includes instructions that, when executed by the processor, cause the processor to compress the first image from the first resolution to the second resolution, the second resolution being less than the first resolution, wherein compressing the first image results in a compressed image and wherein conveying the first image with the second resolution includes conveying the compressed image.

15. The camera of claim 14, wherein the first resolution is a maximum resolution of the camera to capture the image, wherein the second resolution is a transmission resolution, wherein the transmission resolution is less than the maximum resolution.

16. The camera of claim 12, wherein the video processing module further includes instructions that, when executed by the processor, cause the processor to compress the second image from the third resolution to the second resolution, the second resolution being less than the third resolution, wherein compressing the second image results in a compressed image, and wherein the conveying the second image with the second resolution includes conveying the compressed image.

17. The camera of claim 12, wherein the video processing module further includes instructions that, when executed by the processor, cause the processor to convey a crop zone for the cropping parameter to the video capture module, and wherein the video processing module further includes instructions that, when executed by the processor, cause the processor to use the crop zone for cropping the second image.

18. The digital video camera in communication with a second electronic device via a network of claim 12, wherein the second electronic device is configured to:
    receive the first image with the second resolution;
    display the first image with the second resolution;
    receive a digital zoom input;
    transmit the cropping parameter to the first electronic device, the cropping parameter being based on the digital zoom input;
    receive the third image with the second resolution; and
    display the third image with the second resolution.

19. The digital video camera in communication with a second electronic device via a network of claim 18, wherein the second electronic device is further configured to transition to the third image after receiving the marker.

20. A system for capturing, transmitting, and displaying a video, the system comprising:
    a camera comprising:
        a lens,
        an image capture element,
        a processor, and
        a memory communicably coupled to the processor and storing:
        a video capture module including instructions that, when executed by the processor, cause the processor to capture a plurality of images,
        a video processing module including instructions that, when executed by the processor, cause the processor to:
        acquire a first image having a first resolution from the video capture module,
        convey the first image with a second resolution,
        receive a cropping parameter, acquire a second image with a third resolution from the video capture module, and convey the second image having the second resolution, and a communication module including instructions that when executed by the processor cause the processor to:

transmit a plurality of conveyed images from the video processing module, transmit a marker associated with the second image when transmitting the second image, and receive the cropping parameter; and a mobile electronic device comprising an output apparatus to display a plurality of images, an input apparatus to receive a digital zoom input, a second processor, and a second memory communicably coupled to the second processor and storing:

a video display module including instructions that when executed by the second processor cause the second processor to display a plurality of images and to snap to the second image when the mobile electronic device receives the marker, a digital zoom module including instructions that when executed by the second processor cause the second processor to receive a digital zoom input, create the cropping parameter based on the digital zoom input, and convey the cropping parameter, and a communication module including instructions that when executed by the second processor cause the second processor to receive the plurality of conveyed images from the camera, receive the marker from the camera, and to transmit the cropping parameter.

* * * * *